(12) United States Patent
Gerdes et al.

(10) Patent No.: US 11,373,567 B2
(45) Date of Patent: Jun. 28, 2022

(54) LIGHT MODULATED PHOTODIODE-BASED DISPLAY MONITOR SYSTEM

(71) Applicant: Rockwell Collins, Inc., Cedar Rapids, IA (US)

(72) Inventors: Joshua Gerdes, Aurora, OR (US); Eric P. Stratton, Portland, OR (US); Jefferey R. Bader, Aurora, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/152,933

(22) Filed: Jan. 20, 2021

(65) Prior Publication Data

US 2021/0233444 A1 Jul. 29, 2021

Related U.S. Application Data

(60) Provisional application No. 62/965,670, filed on Jan. 24, 2020.

(51) Int. Cl.
*G09G 3/00* (2006.01)
*G01J 1/44* (2006.01)
(Continued)

(52) U.S. Cl.
CPC ............ *G09G 3/006* (2013.01); *G01J 1/0414* (2013.01); *G01J 1/0429* (2013.01); *G01J 1/44* (2013.01);
(Continued)

(58) Field of Classification Search
CPC .. G02B 27/017; G02B 27/01; G02B 27/0093; G01J 9/00; G01J 1/0414; G01J 1/0437;
(Continued)

(56) References Cited

U.S. PATENT DOCUMENTS 9,371,036 B2 6/2016 Schwantner
10,247,943 B1 4/2019 Yu et al.
(Continued)

FOREIGN PATENT DOCUMENTS

EP 1763864 B1 12/2008
WO 2014091435 A1 6/2014
WO 2019092413 A1 5/2019

OTHER PUBLICATIONS

Extended Search Report for European Application No. 21153316.1 dated Jun. 29, 2021, 8 pages.

*Primary Examiner* — Dong Hui Liang
(74) *Attorney, Agent, or Firm* — Suiter Swantz pc llo (57) ABSTRACT

A light-modulated photodiode-based monitor for detecting a control signal of a display is disclosed. The monitor includes an emitter configured to emit a control signal, a polarizer configured to linearly polarize the pulsed signal, one or more fold mirrors configured to reflect the pulsed signal from the emitter onto a test portion and/or reflect the pulsed signal that has reflected off of the test portion. The monitor further includes an analyzer configured to block or transmit the polarized pulse signal reflected from at least one of the fold mirror or the test portion, and a detector configured to receive the pulsed signal transmitted from the analyzer and convert the pulsed signal into an electrical signal. The monitor further includes a controller that includes one or more processors and is configured to receive the electrical signal, filter and rectify the electrical signal, and determine a functional state of the display.

15 Claims, 7 Drawing Sheets

(51) Int. Cl.
  *G01J 1/04* (2006.01)
  *G01J 1/42* (2006.01)
(52) U.S. Cl.
  CPC . *G01J 2001/4238* (2013.01); *G01J 2001/446* (2013.01); *G09G 2330/12* (2013.01)
(58) Field of Classification Search
  CPC ...... G01J 1/16; G01J 2003/064; G09G 3/346; G09G 3/02; G09G 3/32; G09G 2320/064
  See application file for complete search history.

(56) References Cited

U.S. PATENT DOCUMENTS

| | | | |
|---|---|---|---|
| 2007/0273794 A1* | 11/2007 | Sprague | G02B 27/1066 |
| | | | 348/789 |
| 2015/0022898 A1* | 1/2015 | Yamakawa | G01J 1/4257 |
| | | | 356/230 |
| 2017/0188023 A1 | 6/2017 | Brabenac et al. | |
| 2017/0353628 A1* | 12/2017 | Kishigami | H04N 1/6077 |
| 2018/0160087 A1 | 6/2018 | Nill et al. | |
| 2019/0075290 A1 | 3/2019 | Dubey et al. | |
| 2019/0253603 A1 | 8/2019 | Miyagaki et al. | |
| 2019/0385389 A1 | 12/2019 | Fribus et al. | |

* cited by examiner

LIGHT MODULATED PHOTODIODE-BASED DISPLAY MONITOR SYSTEM

CROSS-REFERENCE TO RELATED APPLICATIONS

The present application claims priority to U.S. Provisional Application Ser. No. 62/965,670 filed Jan. 24, 2020 entitled "LIGHT MODULATED PHOTODIODE-BASED DISPLAY MONITOR SYSTEM", which is incorporated herein by reference in their entirety.

BACKGROUND

Head-up displays (HUD) are computer-generated displays that present data on a transparent medium (e.g., a windshield for an aircraft or a visor for a helmet), allowing the user to see the data without having to look away from their usual viewpoints. Data provided by HUDs often offer both information regarding the current status of the vehicle, such as speed as direction, as well as warnings of systems that are not in compliance. HUDs often require rapid updating of displayed data to ensure that the user has the information required for safe operation of the vehicle.

HUDs are susceptible to malfunctioning while in use. For example, the display on a HUD may freeze up, preventing the HUD from updating the displayed data. In another example, a HUD may flip the displayed image. For these reasons, HUDs are monitored so that a malfunctioning HUD may be quickly detected and have the problem addressed. For example, a test section of a display may be dedicated to blinking between on and off states (e.g., white and black screen states), while a detector adjacent to the test section measures the rate of blinking by the test section and compares that information to an expected value. If the expected value is not detected, then the HUD will be flagged as malfunctioning. Strategies for detecting a predicted signal of a test section of a display are often compromised by light generated by the area of the display intended for viewing, which can interfere with the detection of light of the test section by the detector.

SUMMARY

A light-modulated photodiode-based monitor for detecting a control signal of a display is disclosed. In one or more embodiments, the light-modulated photodiode-based monitor includes an emitter configured to emit a pulsed signal. In one or more embodiments, the light-modulated photodiode-based monitor further includes a polarizer configured to linearly polarize the pulsed signal. In one or more embodiments, the light-modulated photodiode-based monitor further includes one or more fold mirrors. In one or more embodiments, the one or more fold mirrors are configured to reflect the pulsed signal from the emitter onto a test portion. In one or more embodiments, the one or more fold mirrors are configured to reflect the pulsed signal that has reflected off of the test portion. In one or more embodiments, the light-modulated photodiode-based monitor further includes an analyzer, configured to block or transmit the polarized pulse signal reflected from at least one of the fold mirror or the test portion. In one or more embodiments, the light-modulated photodiode-based monitor further includes a detector configured to receive the pulsed signal transmitted from the analyzer and convert the pulsed signal into an electrical signal. In one or more embodiments, the light-modulated photodiode-based monitor further includes a controller comprising one or more processors. In one or more embodiments, the controller is configured to receive the electrical signal from the detector. In one or more embodiments, the controller is configured to filter the electrical signal, wherein the filtered signal may be discerned from interfering signals created by an illumination of a viewable section of the display. In one or more embodiments, the controller is configured to rectify the electrical signal. In one or more embodiments, the controller is configured to determine a functional state of the display.

In some embodiments of the light-modulated photodiode-based monitor the display may be configured as a head up display.

In some embodiments of the light-modulated photodiode-based monitor, the display may comprise at least one of a liquid crystal on silicon display, a liquid crystal display, a digital light processing display, an organic light emitting diode display, an inorganic light emitting diode display, or a micro light emitting diode display.

In some embodiments of the light-modulated photodiode-based monitor, the emitter is configured as a light emitting diode.

In some embodiments of the light-modulated photodiode-based monitor, the emitter is configured as a laser.

In some embodiments of the light-modulated photodiode-based monitor, the emitter is configured to output the pulsed signal in a range of 5 kHz to 50 kHz.

In some embodiments of the light-modulated photodiode-based monitor, the detector comprises at least one of a photodiode, metal-semiconductor-metal photodetector, phototransistor, photoconductive detector, phototube, or photomultiplier.

In some embodiments of the light-modulated photodiode-based monitor, the controller is further configured to report a status of the display.

A display is also disclosed. In one or more embodiments, the display includes a test portion. In some embodiments, the display further includes a light-modulated photodiode-based monitor for detecting a control signal of the display. In one or more embodiments, the light-modulated photodiode-based monitor includes an emitter configured to emit a pulsed signal. In one or more embodiments, the light-modulated photodiode-based monitor further includes a polarizer configured to linearly polarize the pulsed signal. In one or more embodiments, the light-modulated photodiode-based monitor further includes one or more fold mirrors. In one or more embodiments, the one or more fold mirrors are configured to reflect the pulsed signal from the emitter onto the test portion. In one or more embodiments, the one or more fold mirrors are configured to reflect the pulsed signal that has reflected off of the test portion. In one or more embodiments, the light-modulated photodiode-based monitor further includes an analyzer, configured to block or transmit the polarized pulse signal reflected from at least one of the fold mirror or the test portion. In one or more embodiments, the light-modulated photodiode-based monitor further includes a detector configured to receive the pulsed signal transmitted from the analyzer and convert the pulsed signal into an electrical signal. In one or more embodiments, the light-modulated photodiode-based monitor further includes a controller comprising one or more processors. In one or more embodiments, the controller is configured to receive the electrical signal from the detector. In one or more embodiments, the controller is configured to filter the electrical signal, wherein the filtered signal may be discerned from interfering signals created by an illumination of a viewable section of the display. In one or more embodiments, the controller is configured to rectify the electrical signal. In one or more embodiments, the controller is configured to determine a functional state of the display.

In some embodiments of the display, the display may be configured as a head up display.

In some embodiments of the display, the display may comprise at least one of a liquid crystal on silicon display, a liquid crystal display, a digital light processing display, an organic light emitting diode display, an inorganic light emitting diode display, or a micro light emitting diode display.

In some embodiments of the display, the emitter is configured as a light emitting diode.

In some embodiments of the display, the emitter is configured as a laser.

In some embodiments of the display, the emitter is configured to output the pulsed signal in a range of 5 kHz to 50 kHz.

In some embodiments of the display, the detector comprises at least one of a photodiode, metal-semiconductor-metal photodetector, phototransistor, photoconductive detector, phototube, or photomultiplier.

In some embodiments of the display, the controller is further configured to report a status of the display.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A light modulated photodiode-enabled HUD monitoring device is disclosed. In implementations, the light modulated photodiode-enabled HUD monitoring device tests the display of the HUD (e.g., of a liquid crystal on silicon (LCOS) display) by pulsing an LED onto a test section of the HUD display at a high rate that can be distinguished from the frequency of the illuminator. The signal reflected off of the LCOS is received by a detector, creating an electrical signal which can then be filtered and converted to a digital input and tested to see if the received signal matches the expected signal of a properly operating HUD.

The advantages of the light modulated photodiode-enabled HUD monitoring device over a conventional HUD monitoring device include a reduced requirement for preventing light from the display area that is intended for viewing from leaking into the test area. Conventional HUD monitoring devices require strict separation of the viewing area of the display from the test area of the display. This often requires the use and utilization of gaskets and/or adhesives under narrow tolerance specifications that can result in high failure rates. Optical filters may also be used to separate interfering light signals. However, the same optical filters reduce the control light signal to the detector, reducing the robustness of the monitoring device and increasing failure rates. The light modulated photodiode-enabled HUD monitoring device of this disclosure solves the problem of light interference by creating a control signal and detector arrangement that is immune to light from the illuminator.

Figure 1:
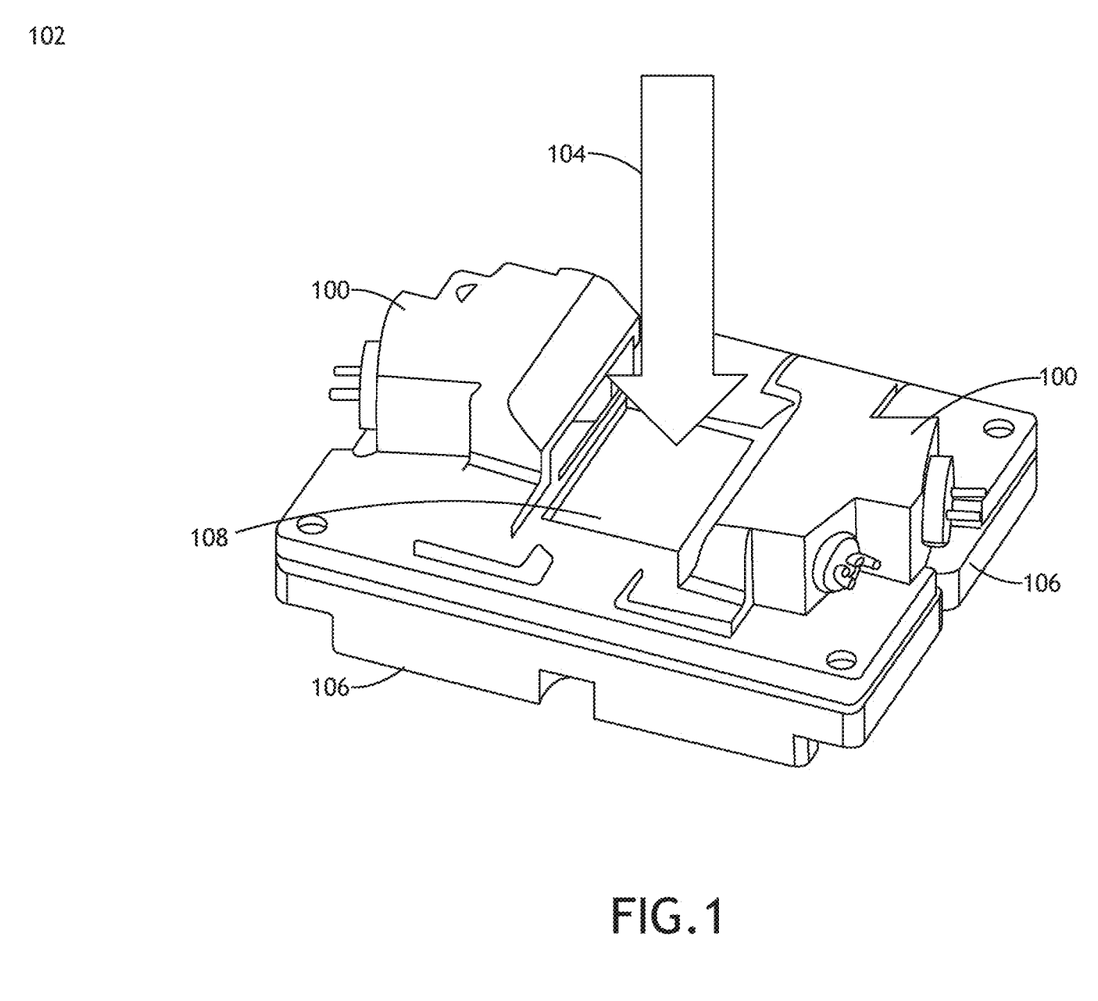
FIG. 1 is an illustration of a light modulated photodiode-enabled HUD monitoring device attached to a HUD display, in accordance with one or more embodiments of this disclosure.

In some embodiments, the photodiode-based HUD monitoring device is attached to an HUD display. FIG. 1, illustrates two light modulated photodiode-enabled HUD monitoring devices 100 attached to a HUD display 102 (e.g., a LCOS display), in accordance with one or more embodiments of this disclosure. HUD displays 102 are wavelength selective switching devices, containing a multitude of reflective aluminum electrodes often arranged in an array (e.g., a 1024 by 768 grid array for XGA resolution). Each electrode is capable of reflecting a light source with modified wavelength that is dependent on the voltage applied to the specific electrode, the voltage controlled by a CMOS chip 106 or other type of circuitry. Upon illumination 104 by an illuminator (e.g., a high intensity lamp) upon the viewable section 108 of the HUD display 102, the HUD display 102 reflects the wavelength modified light outward towards lenses and/or a screen, where the image is displayed for a user. The HUD display 102 may be any type of display including but not limited to a compact HUD (CHUD).

In FIG. 1, the shielding of the light modulated photodiode-enabled HUD monitoring device 100 obfuscates many of the components of the HUD monitoring device 100. Any type of display may be configured with the light modulated photodiode-enabled HUD monitoring device 100 including but not limited to the LCOS display, an LCD display, a Digital Light Processing (DLP) display, an Organic Light Emitting Diode (OLED) display, a micro-LED display, an inorganic light emitting diode display, or any other light emitting diode display. Therefore, the above description should not be interpreted as a limitation of the present disclosure, but merely as an illustration.

Figure 2:
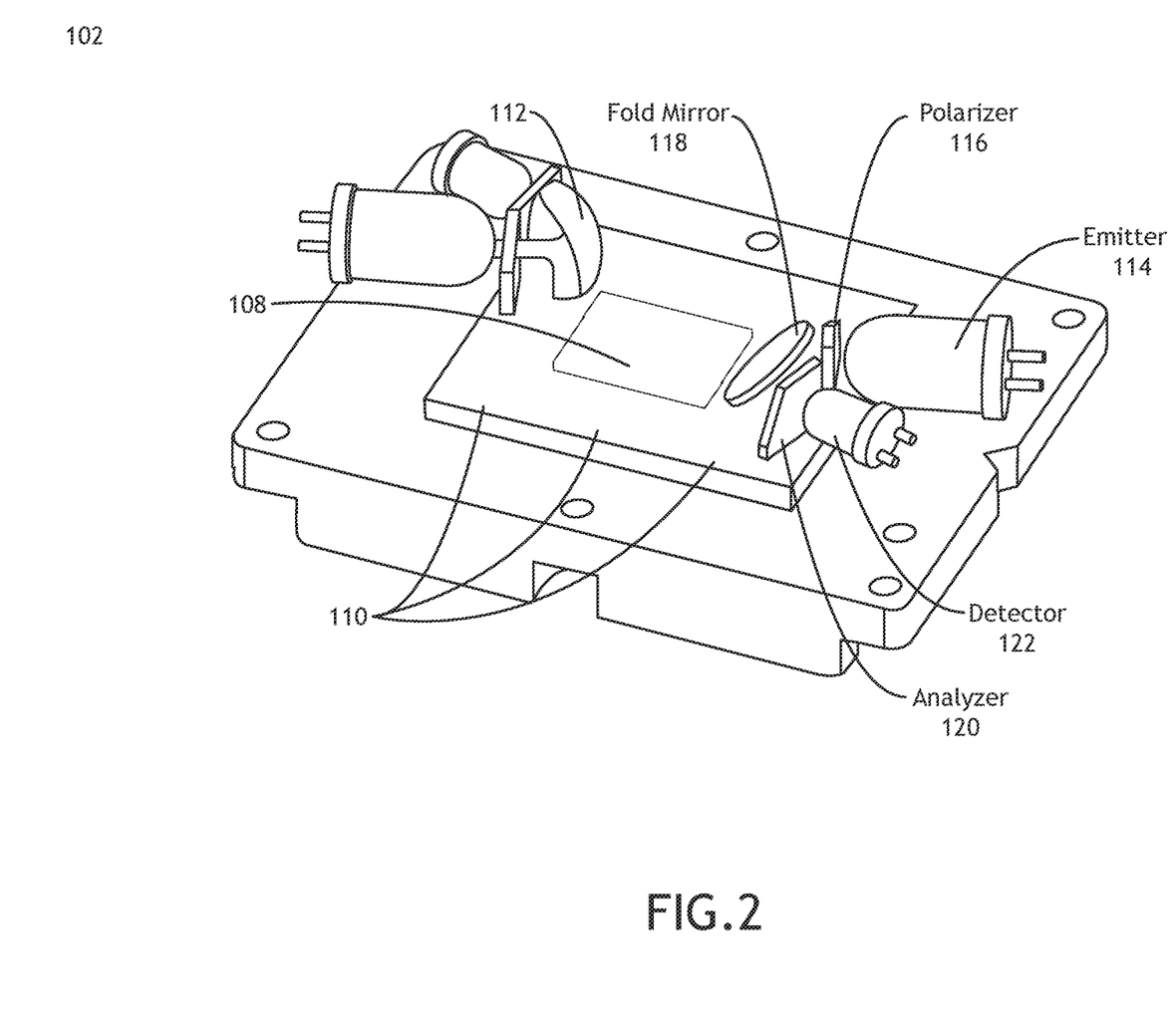
FIG. 2 is an illustration of a light modulated photodiode-enabled HUD monitoring device with the shielding removed, in accordance with one or more embodiments of this disclosure.

FIG. 2 illustrates the light modulated photodiode-enabled HUD monitoring device 100 with the shielding removed, in accordance with one or more embodiments of this disclosure. Removal of the shielding of the light modulated photodiode-enabled HUD monitoring device 100 reveals the non-viewable sections 110 of the HUD display 102. The non-viewable sections 110 of the HUD display 102 have are constructed with the same reflective aluminum electrodes as the viewable section 108 of the HUD display 102. Because of this, a test portion 112 of the non-viewable section 110 can be used to test whether the HUD display 102 is malfunctioning (e.g., has a frozen screen or has a flipped screen).

In some embodiments, the light modulated photodiode-enabled HUD monitoring device 100 includes an emitter 114. The emitter 114 emits a pulsed signal (e.g., a control signal of emitted light) to be reflected off of a test portion 112 of the HUD display 102. The emitter 114 may be of any type of light emitting device used in the art including but not limited to a light emitting diode (LED) or a laser. For example, the emitter 114 may be an LED configured to produce red light. In another example, the 114 may be a laser configured to produce blue light.

In some embodiments, the emitter 114 is configured to output a pulsed signal. For example, light may be pulsed in a range of 100 Hz to 1 MHz. In another example, the light may be pulsed in a range of 1 kHz to 100 kHz. In another example, the light may be pulsed in a range of 5 kHz to 50 kHz. For instance, the light may be pulsed at approximately 10 kHz. Since light from an LCOS illuminator is typically pulse-width modulated at 120 Hz for brightness control, a light modulated photodiode-enabled HUD monitoring device 100 that utilizes a control pulse with considerably different frequencies (e.g., 10 kHz) may still allow the discernment between the illuminator light and the control light, even if there is bleed through from the illuminator light reflected from the viewable section 108 into the test portion 112 of the HUD display 102.

In some embodiments, the light modulated photodiode-enabled HUD monitoring device 100 further includes a sheet polarizer 116. The sheet polarizer 116 linearly polarizes the pulsed signal from the emitter 114. The sheet polarizer 116 may be any linearizing sheet polarizer used in the art including but not limited to a Polaroid polarizer or a poly-vinyl alcohol (PVA) polarizer.

In some embodiments, the light modulated photodiode-enabled HUD monitoring device 100 further includes a fold mirror 118. The fold mirror 118 directs the pulsed signal from the emitter 114 to the test portion 112 of the HUD display 102. The fold mirror 118 may be constructed of any material known in the art. Once the pulsed signal from the emitter 114 reaches the test portion 112 of the HUD display 102, the pulsed signal will be reflected from the display based on the voltage conditions of the aluminum electrodes (e.g., set by the CMOS chip 106) that are buried just below the surface of the HUD display 102. For example, the test portion 112 of the HUD display may be set to alternate between black and white approximately every eight to ten frames. (i.e., that is, set so that a light that illuminates the test portion 112 will reflect either a relatively intense light signal, or a reduced light signal). If the emitted pulsed signal reaches the HUD display 102 when the test portion 112 is set to reflect a white light, then an enhanced light signal will be reflected from the HUD display 102. If the emitted signal reaches the HUD display 102 when the test portion is set to black, then a reduced light signal (e.g., pulsed signal) will be reflected from the HUD display 102. The result is a toggled high/low signal that can then be used to discern if the test portion is alternating from black to white, or whether the HUD display 102 is frozen. Due to the action of the polarizer 116, the reflected pulsed signal from the test portion 112 of the HUD display 102 alternates between 0° polarization rotation and 90° polarization rotation.

In some embodiments, pulses signal from the emitter 114 that is reflected (i.e., directed) onto the test portion 112 by the fold mirror 118 is itself reflected by the test portion 112 back to the fold mirror 118 where the pulsed signal is then reflected to an analyzer 120. The analyzer is comprised of a linear polarizer that blocks or transmits the reflected pulsed signal from the fold mirror 118, depending on the polarization state. In some embodiments, the pulsed signal continuing through the analyzer is detected by the detector 122. The detector 122 detects the emitted light signal, where it produces an electric signal that is then evaluated by circuitry within the light modulated photodiode-enabled HUD monitoring device 100. The detector may be any type of photo-detector known in the art, including but not limited to a photodiode, metal-semiconductor-metal photodetector, phototransistor, photoconductive detector, phototube, or photomultiplier. For example, the detector may be a photodiode commonly used in HUD displays. It should be known that more than one mirrors may be used in reflecting the emitted pulsed signal to the detector 122. Therefore, the above description should not be interpreted as a limitation of the present disclosure, but merely as an illustration.

Figure 3:
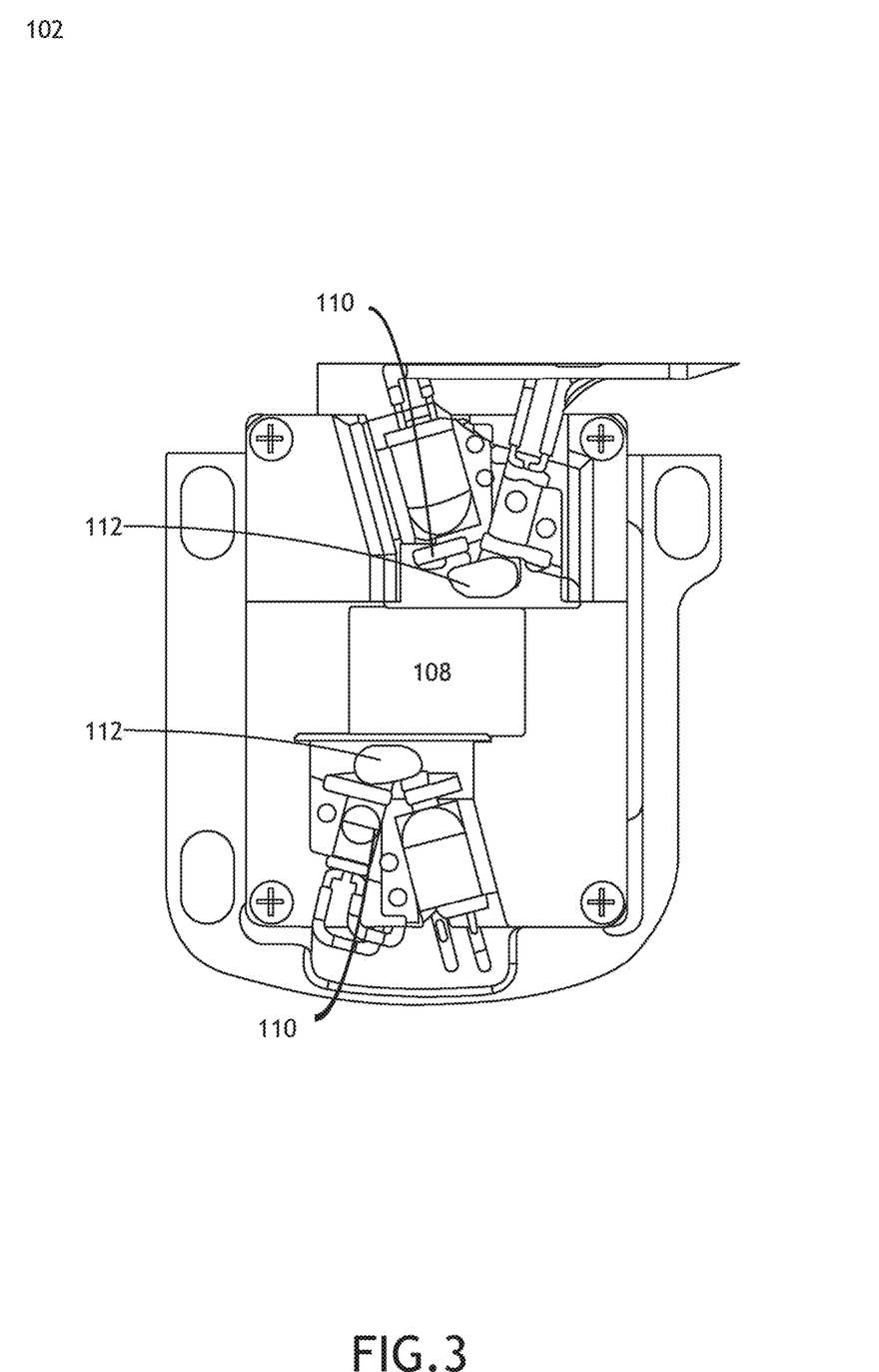
FIG. 3 is a plan view of an illustration of the light modulated photodiode-enabled HUD monitoring device disposed upon the HUD display, in accordance with one or more embodiments of this disclosure.

In some embodiments, the non-viewable sections 110 of the HUD display 102 may contain more than one test portion 112. FIG. 3 illustrates a plan view of the light modulated photodiode-enabled HUD monitoring device 100 disposed upon the HUD display 102, in accordance with one or more embodiments of this disclosure. In this embodiment, two light modulated photodiode-enabled HUD monitoring devices 100 are disposed upon opposite sides of the HUD display 102 (i.e., at two opposing corners), each monitoring a test portion 112 of the HUD display 102, with no aspect of either light modulated photodiode-enabled HUD monitoring device 100 blocking the viewable section 108 of the HUD display 102. Increasing the number of light modulated photodiode-enabled HUD monitoring devices 100 enhances the accuracy of HUD display 102 monitoring.

Figure 4:
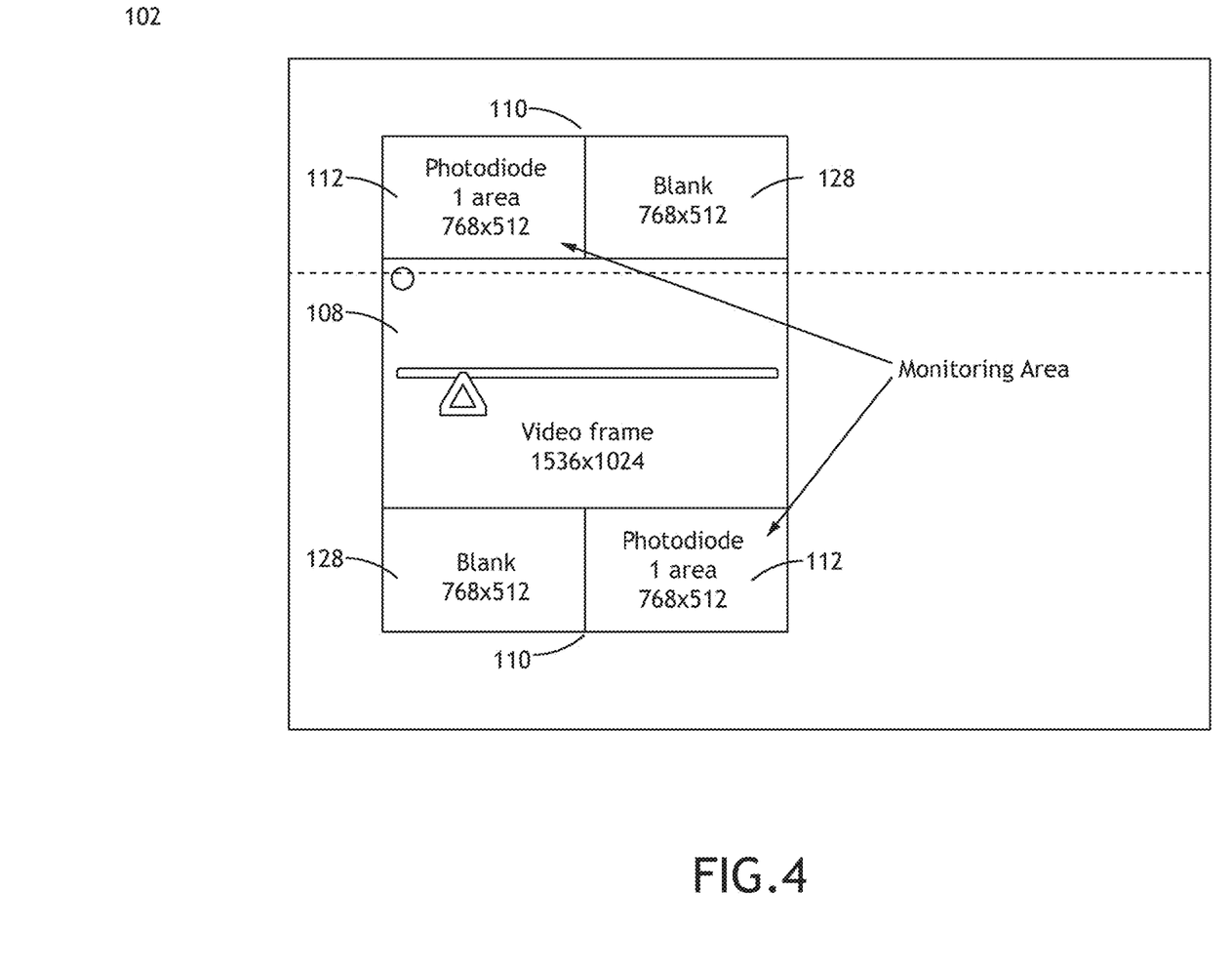
FIG. 4 is an illustration of the layout of a HUD display, in accordance with one or more embodiments of this disclosure.

The layout of the HUD display 102 with multiple test portions 112 are described further in FIG. 4. As aforementioned, in embodiments, the HUD display 102 is configured to have two non-viewing sections 110 (e.g., monitoring areas or photodiode areas) at opposite ends. Each non-viewing section 110 may be configured to have a test portion 112, with a blank portion 128 that is either unused or used for a different purpose. It should be known that one or more test portions 112, may be monitored on an HUD display 102, with each test portion 112 monitored by a separate light modulated photodiode-enabled HUD monitoring device 100. For example, an HUD display 102 may be configured to have one test portion. In another example, the HUD display may be configured to have four test portions. Therefore, the above description should not be interpreted as a limitation of the present disclosure, but merely as an illustration.

Figure 5:
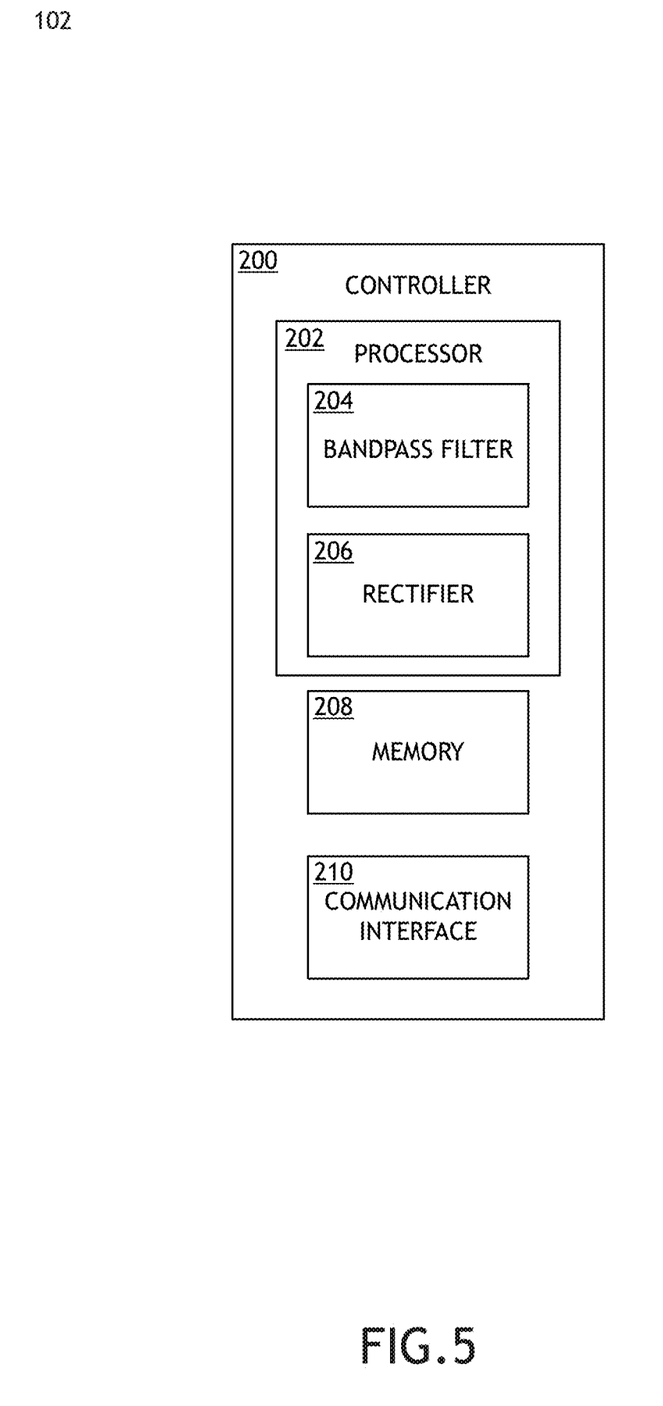
FIG. 5 is a block diagram illustrating a controller of the light modulated photodiode-enabled HUD monitoring device, in accordance with one or more embodiments of this disclosure.

In some embodiments, the activities of the emitter 114, detector 122, and other components of the light modulated photodiode-enabled HUD monitoring device 100, as well as the methods to analyze electrical signals received from the detector 122 are controlled by a controller 200. FIG. 5 is a block diagram illustrating a controller of the light modulated photodiode-enabled HUD monitoring device 100, in accordance with one or more embodiments of this disclosure. The controller 200 provides processing functionality for the light modulated photodiode-enabled HUD monitoring device 100 and its components. The controller includes one or more processors 202. The one or more processors may include any type of processing elements, including but not limited to integrated circuits (e.g., application specific integrated circuits (ASIC), field programmable gate arrays (FPGA)). For example, one processor for the light modulated photodiode-enabled HUD monitoring devices 100 may be the CMOS chip used to control the HUD display. In another example, the processor is a collection of circuits and components on a circuit card (e.g., a circuit card assembly (CCA) or printed circuit board (PCB)). The processors may also include circuitry components required to filter and modulate the incoming signals generated by the light modulated photodiode-enabled HUD monitoring devices 100 including but not limited to bandpass filters 204 a-c and rectifiers 206.

The controller may also include resident or external memory 208 for storing data, executional code, and other resident or external memory 208 generated by the light modulated photodiode-enabled HUD monitoring devices 100. The controller 200 can execute one or more software programs embodied in a non-transitory computer readable medium (e.g., memory 208) that implement techniques described herein. In some embodiments, the controller 200 is not limited by the materials from which it is formed or the processing mechanisms employed therein and, as such, can be implemented via semiconductor(s) and/or transistors (e.g., using electronic integrated circuit (IC) components), and so forth.

The memory 208 can be an example of tangible, computer-readable storage medium that provides storage functionality to store various data and/or program code associated with operation of the light modulated photodiode-enabled HUD monitoring device 100 and/or controller 200, such as software programs and/or code segments, or other data to instruct the controller 200, and possibly other components of the light modulated photodiode-enabled HUD monitoring device 100, to perform the functionality described herein. Thus, the memory 208 can store data, such as a program of instructions for operating the controller 200, the light modulated photodiode-enabled HUD monitoring device 100, and its components. It should be noted that while a single memory 208 is described, a wide variety of types of combinations of memory (e.g., tangible, non-transitory memory) may be employed. The memory 208 can be integral with the controller 200, can comprise stand-alone memory, or can be a combination of both. Some examples of the memory 208 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth. In some embodiments, the controller 200 and/or the light modulated photodiode-enabled HUD monitoring device 100 does not include a memory.

The controller also includes a communication interface 210. The communication interface 210 may be operatively configured to communicate with the light modulated photodiode-enabled HUD monitoring device 100 and its components, as well as the HUD display 102 and the data processing device for the HUD display 102. For example, the communication interface 210 can be configured to retrieve data from the controller 200 or other devices (e.g., the detector 122, the emitter, and/or other components of the light modulated photodiode-enabled HUD monitoring device 100), transmit data for storage in the memory 208, retrieve data from storage in the memory 208, and so forth. The communication interface 210 can also be communicatively coupled with the controller 200 to facilitate data transfer between components of the light modulated photodiode-enabled HUD monitoring device 100 and the controller 212. The communication interface 210 may also facilitate data transfer between the light modulated photodiode-enabled HUD monitoring device 100 and the HUD display 102 and/or the processing device(s) of the HUD display.

It should be noted that while the communication interface 210 is described as a component of the light modulated photodiode-enabled HUD monitoring device 100, one or more components of the communication interface 210 may be implemented as external components communicatively coupled to the light modulated photodiode-enabled HUD monitoring device 100 via a wired and/or wireless connection.

Figure 6:
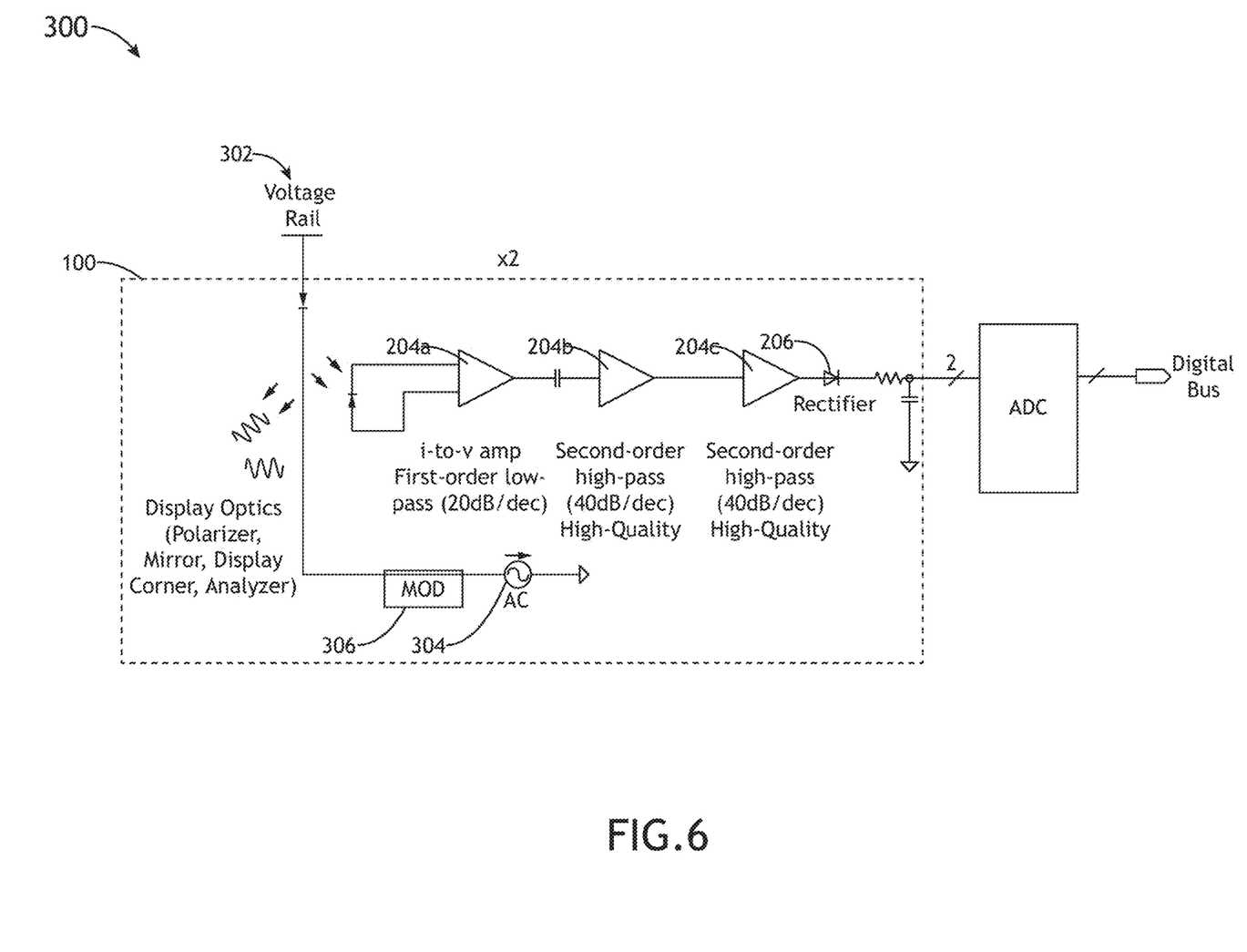
FIG. 6 is a schematic illustration of circuitry for processing an electrical signal received from a detector, in accordance with one or more embodiments of this disclosure.

In some embodiments, the controller 200 of the light modulated photodiode-enabled HUD monitoring device 100 further includes circuitry 300 to filter and modulate the electrical signal received from the detector 122. A representation of the circuitry 300 required for processing of the signal received by the detector 122 is shown in FIG. 6. Components of the circuitry 300 that may be included within the light modulated photodiode-enabled HUD monitoring device 100 are enclosed within the box with the dashed border in FIG. 6. In embodiments, the circuitry includes one or more bandpass filters 204 *a-c*. The bandpass filters 204 *a-c* filter out unwanted signals within the light modulated photodiode-enabled HUD monitoring device 100 (e.g., incoming electrical signals derived from the illumination from the illuminator and light from the illuminator that is reflected off of the HUD display 102). By filtering out the interfering electrical signals that originated as light from the viewable section of the HUD display 102, the light modulated photodiode-enabled HUD monitoring device 100 can more easily discern between the light emitted from the emitter 114 and other interfering light (i.e., the light modulated photodiode-enabled HUD monitoring device 100 becomes immune to the illuminator).

In some embodiments, the circuitry 300 includes one or more low-pass filters. The low-pass filter attenuates portions of the signal received by the detector 122 that have frequencies below a predetermined level (e.g., frequencies below the signal to be isolated by the light modulated photodiode-enabled HUD monitoring device 100). For example, the circuitry may include a first order low-pass filter with an attenuation of 20 dB/dec. In some embodiments, the circuitry 300 includes one or more high-pass filters. The high-pass filter attenuates portions of the signal received by the detector 122 that have frequencies above a predetermined level (e.g., frequencies above the signal to be isolated by the light modulated photodiode-enabled HUD monitoring device 100). For example, the circuitry may include one or more second order high-pass filter with an attenuation of 40 dB/dec. It should be known that any number and type of bandpass, low-pass, and high-pass filter may be used within the circuitry 300 of the light modulated photodiode-enabled HUD monitoring device 100. Therefore, the above description should not be interpreted as a limitation of the present disclosure, but merely an illustration.

In some embodiments, the circuitry 300 includes a rectifier 206. The rectifier 206 modifies the electrical signal exiting the bandpath filter(s) 204 *a-c* from alternative current to direct current. The modification of the signal by the rectifier also allows the electrical signal to be analyzed and processed by downstream componentry, such as an analog-digital converter (ADC) 310. The rectifier 206 used in the light modulated photodiode-enabled HUD monitoring device 100 may be any type of rectifier 206 used in the art including but not limited to a full-wave rectifier, a single-phase rectifier, a three-phase rectifier, or a voltage-multiplying rectifier. For example, the rectifier 206 may be a single-phase full wave rectifier. Through the use of bandpass filters 204 *a-c* and rectifiers 206, along with other signal amplifying components of the circuitry, a pulsed, narrowly filtered (e.g., ~10 kHz) and amplified signal may be successfully used by downstream componentry to discern the control signal from interfering illumination (e.g., by comparing digitized control sample signal to predicted signals and determining if the digitized control sample signal deviates from a threshold value, which may determine if the display is functioning correctly).

In some embodiments, the circuitry includes a voltage rail 302 supplying a voltage to the circuitry 300 and a current source 304 coupled to supply current to the voltage rail. In some embodiments, the circuitry 300 further includes a current modulator 306. The current modulator 306 is configured to alter an aspect of the current within the circuitry 300 in order to optimize the ability of the light modulated photodiode-enabled HUD monitoring device 100 to emit and detect the emitted signal and discern the signal from interfering noise (i.e., the current modulator 306 may act as a feedback loop). For example, the current modulator 306 may alter the magnitude of the current used within the circuitry 300. In another example, the current modulator 306 may alter the frequency of the AC current within the circuitry 300. In another example, the current modulator 306 may alter the pulse width of the current used in the circuitry 300. Feedback modification of the current by the current modulator 306 may then increase the ability of the modulated emitted signal to be isolated and analyzed for HUD display 102 malfunctions. In some embodiments, the circuitry does not include a current modulator 306.

Figure 7:
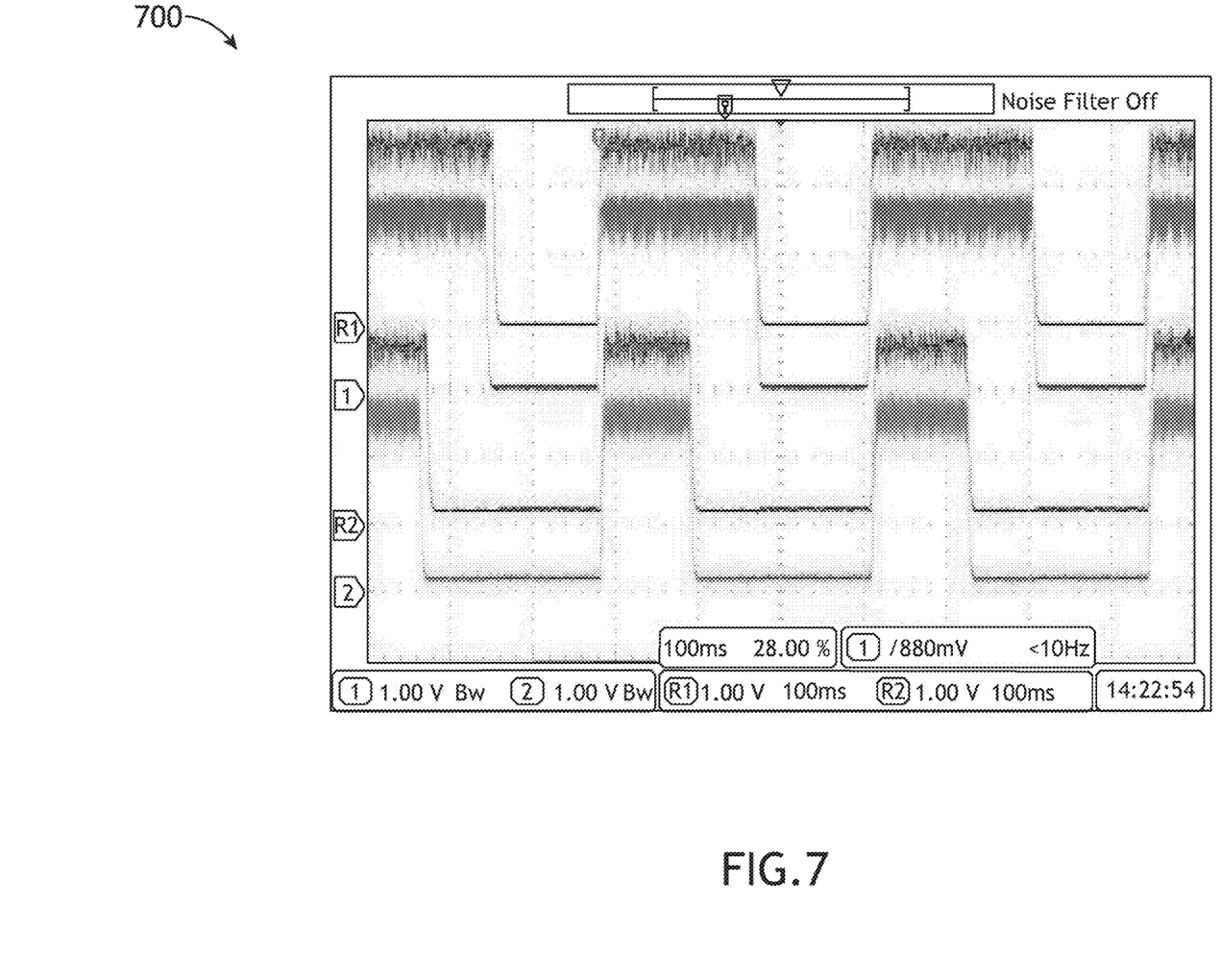
FIG. 7 is a graph illustrating sample results from a photodiode-enabled HUD monitoring device. in accordance with one or more embodiments of this disclosure.

FIG. 7 is a graph 700 illustrating sample results from a photodiode-enabled HUD monitoring device 100. The X-axis of the graph represents elapsed time, whereas the Y-axis represents signal intensity. Four conditions are represented in the graph 700. The yellow and blue conditions (e.g., channels one and two, respectively) represent two channels where the photodiode received signals at the same time that the illuminator was operating at maximum brightness. The grey conditions (e.g., channels R1 and R2, respectively, represent two channels where the photodiode received signals at the same time that the illuminator was off. During the sampled time, the test portion 112 of the HUD display 102 switched back and forth from 'white' and 'black' four times. This switching is manifested in the graph 700 as showing three areas where all signals have a lowered, or trough, signal (i.e., created when the test portion 112 was black) and four areas that have an increased signal (i.e., when the test portion 112 was white). Under all four conditions, a substantial difference in signal intensity was detected by the light modulated photodiode-enabled HUD monitoring device 100 when the test portion 112 switched from black to white, regardless if the illuminator was at full intensity. This result confirms that the light modulated photodiode-enabled HUD monitoring device 100 is capable of discerning a control signal from the test portion 112 without having to rely on extraneous methods to block light from the illuminator from the detector, such as by applying a gasket or glue at the boundary of the viewable section 108 and the test portion 112 to prevent bleed-through of light from the viewable section from entering the test portion 112, or by applying an optical filter, which reduces the light signal to the detector 120. Once the determination by the controller 200 (e.g., via the circuitry 300) of the functional state of the HUD display 102 is determined (e.g., working properly or improperly), the controller may then report to the HUD display 102 or other componentry and/or device of the status of the HUD display 102.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A light-modulated photodiode-based monitor for detecting a control signal of a display comprising:
    an emitter, configured to emit a pulsed signal;
    a polarizer configured to linearly polarize the pulsed signal;
    one or more fold mirrors, configured to perform at least one of:
        reflecting the pulsed signal from the emitter onto a test portion; or
        reflecting the pulsed signal that has reflected off of the test portion;
    an analyzer, configured to block or transmit the polarized pulse signal reflected from at least one of the fold mirror or the test portion;
    a detector, configured to receive the pulsed signal transmitted from the analyzer and convert the pulsed signal into an electrical signal; and
    a controller comprising one or more processors, and configured to perform the steps of:
        receiving the electrical signal from the detector;
        filtering the electrical signal, wherein the filtered signal may be discerned from interfering signals created by an illumination of a viewable section of the display;
        rectifying the electrical signal; and
        determining a functional state of the display.

2. The light-modulated photodiode-based monitor of claim 1, wherein the display may be configured as a head up display.

3. The light-modulated photodiode-based monitor of claim 1, wherein the display may comprise at least one of a liquid crystal on silicon display, a liquid crystal display, a digital light processing display, an organic light emitting diode display, an inorganic light emitting diode display, or a micro light emitting diode display.

4. The light-modulated photodiode-based monitor of claim 1, wherein the emitter is configured as a light emitting diode.

5. The light-modulated photodiode-based monitor of claim 1, wherein the emitter is configured as a laser.

6. The light-modulated photodiode-based monitor of claim 1, wherein the emitter is configured to output the pulsed signal in a range of 5 kHz to 50 kHz.

7. The light-modulated photodiode-based monitor of claim 1, wherein the detector comprises at least one of a photodiode, metal-semiconductor-metal photodetector, phototransistor, photoconductive detector, phototube, or photomultiplier.

8. The light-modulated photodiode-based monitor of claim 1, wherein the controller is further configured to report a status of the display.

9. A display comprising:
    a test portion; and
    a light-modulated photodiode-based monitor for detecting a control signal of the display comprising:
        an emitter, configured to emit a pulsed signal;
        a polarizer configured to linearly polarize the pulsed signal;
        one or more fold mirrors, configured to perform at least one of:
            reflecting the pulsed signal from the emitter onto the test portion; or
            reflect the pulsed signal that has reflected off of the test portion,
        an analyzer, configured to block or transmit the polarized pulsed signal reflected from at least one of the fold mirror or the test portion,
        a detector, configured to receive the pulsed signal transmitted from the analyzer and convert the pulsed signal into an electrical signal,
        one or more processors; and
        a controller, configured to perform the steps of:
            receiving the electrical signal from the detector,
            filtering the electrical signal, wherein the filtered signal may be discerned from interfering signals created by an illumination of a viewable section of the display,
            rectifying the electrical signal, and
            comparing the electrical signal to a threshold to determine if the display is functioning properly.

10. The display of claim 9, wherein the display may be configured as a head up display.

11. The display of claim 9, wherein the display may comprise at least one of a liquid crystal on silicon display, a liquid crystal display, a digital light processing display, an organic light emitting diode display, an inorganic light emitting diode display, or a micro light emitting diode display.

12. The display of claim 9, wherein the emitter is configured as a light emitting diode.

13. The display of claim 9, wherein the emitter is configured as a laser.

14. The display of claim 9, wherein the emitter is configured to output the pulsed signal in a range of 5 kHz to 50 kHz.

15. The display of claim 9, wherein the detector comprises at least one of a photodiode, metal-semiconductor-metal photodetector, phototransistor, photoconductive detector, phototube, or photomultiplier.

* * * * *